United States Patent [19]

Kovats

[11] 3,970,190
[45] July 20, 1976

[54] ROLLER CHAIN CONVEYOR BELT
[75] Inventor: Lawrence H. G. Kovats, Mentor, Ohio
[73] Assignee: Mayfran Incorporated, Mayfield Village, Ohio
[22] Filed: Nov. 4, 1974
[21] Appl. No.: 520,499

[52] U.S. Cl. .............................. 198/189; 198/196
[51] Int. Cl.² ...................................... B65G 17/00
[58] Field of Search .......... 198/196, 195, 204, 109, 198/189, 191, 201

[56] References Cited
UNITED STATES PATENTS

| | | | |
|---|---|---|---|
| 2,416,634 | 2/1947 | McBride | 198/196 |
| 3,112,822 | 12/1963 | Meyfarth, Jr. | 198/195 X |
| 3,554,361 | 1/1971 | Keough | 198/196 |

FOREIGN PATENTS OR APPLICATIONS

| | | | |
|---|---|---|---|
| 1,131,487 | 4/1955 | France | 198/196 |
| 1,152,082 | 8/1963 | Germany | 198/201 |

Primary Examiner—Robert J. Spar
Assistant Examiner—James M. Slattery
Attorney, Agent, or Firm—Meyer, Tilberry & Body

[57] ABSTRACT

A steel slatted conveyor belt wherein the slats are supported by a pair of conventional roller chains moving on a supporting track and the impact and longitudinal loadings on the slats are transmitted longitudinally by an additional set of slat side links, the ends of which overlap and are pivoted relative to each other by the roller chain shafts. The conveyor slats are Z shaped in transverse cross-section and are rigidly fixed to the slat side links.

1 Claim, 4 Drawing Figures

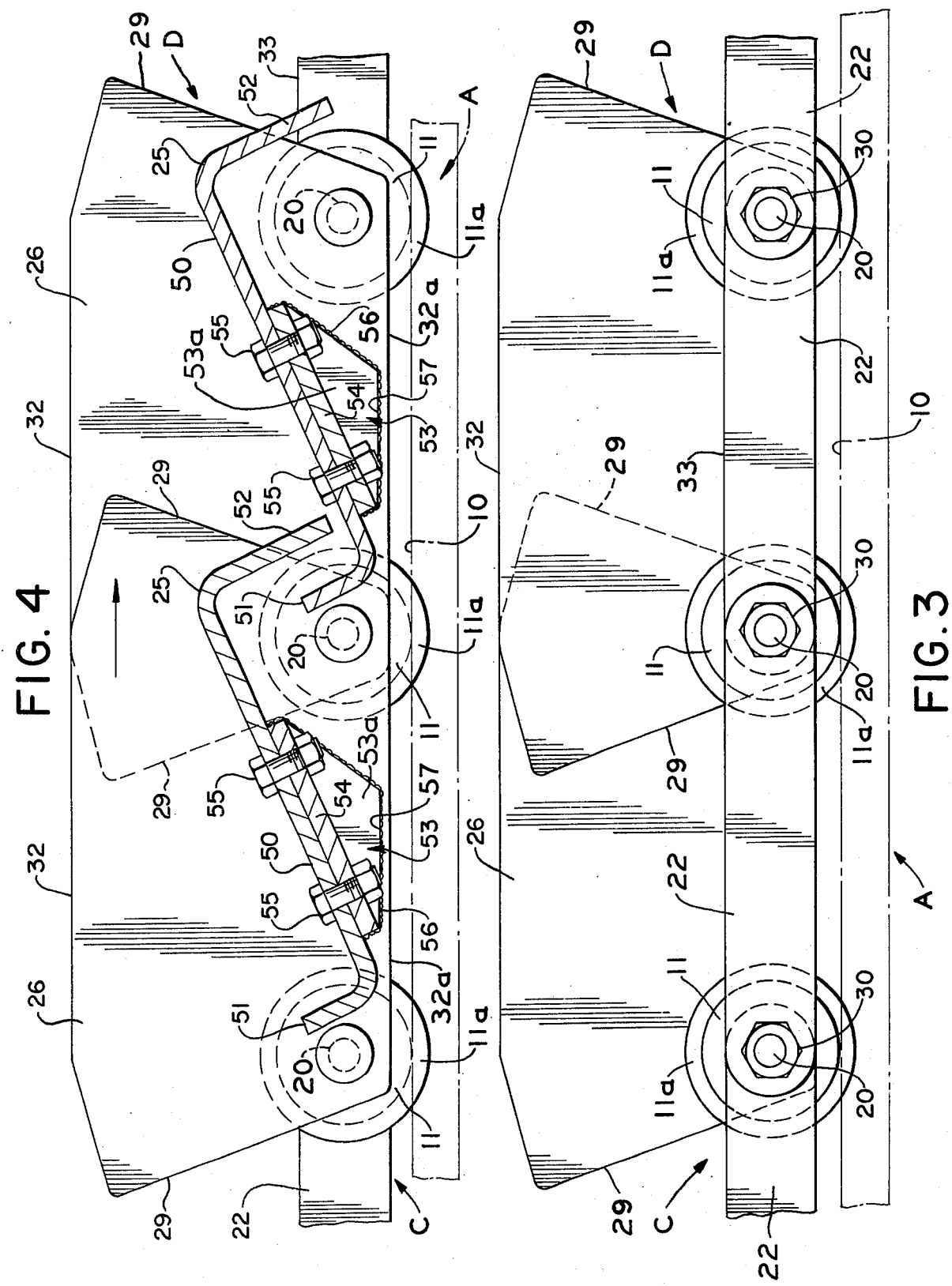

ROLLER CHAIN CONVEYOR BELT

This invention pertains to the art of metal-slatted, roller-chain conveyor belts and more particularly to an improved construction for such conveyor belts which are subjected to heavy loading and/or high impacts.

In the art of conveyor belts, it has been conventional in the past to provide a frame having a pair of roller guides aligned with pairs of sprocket wheels at the ends, a plurality of slats between the guides and a roller chain affixed to the metal slats and supported on the roller guides and moving around the sprockets to provide an endless belt. Heretofore, it has been conventional to fasten the metal slats of the belt directly to the side plates of the roller chain or to have the roller shafts extend transversely across the width of the belt and to have the metal slats hingedly connected to these shafts.

The last construction usually provides a smooth surfaced belt which is unsatisfactory for carrying large loads up a high angled slope. The first described construction requires that the roller chain itself be designed for the particular application of the conveyor belt and in particular, if the impact of or tension loadings on the belt are severe, then the roller chain must be made considerably larger than would otherwise be the case to simply guide and support the belt as it moves. Furthermore, in these prior constructions, should a conveyor slat have to be replaced, it was necessary to disassemble the roller chain in order to replace such a slat.

THE INVENTION

The present invention provides a metal slatted conveyor belt which overcomes the above referred difficulties and enables one size chain to service a number of different types of loading and/or size slats and wherein a conveyor slat can readily be replaced without disassembling the entire belt.

In accordance with the present invention, a roller chain type conveyor belt is provided comprised of a pair of transversely spaced, conventional roller chains movable on tracks and around sprockets at the end of the tracks and having the usual overlapping chain links on each side of the rollers, in combination with a second set of overlapping slat links, usually of a heavier construction, to which the conveyor slats are affixed and which links are pivoted relative to each other by the roller chain shafts themselves whereby shock loads on the belt are transmitted longitudinally through the second set of overlapping links and independently of the chain itself. The conveyor slats are Z shaped in cross-section and are rigidly fastened to the second set of links.

The principal object of the invention is the provision of new and improved roller chain type conveyor belt which is more able to withstand high impact loading than heretofore known belts of this type.

Another object of the invention is the provision of the new and improved roller chain conveyor belt wherein the slats of the belt can be readily replaced without disassembling the roller chain.

Another object of the invention is the provision of new and improved roller chain belt having improved lateral stability.

The invention may take physical form in certain parts and arrangements of parts of preferred embodiment of which will be described in detail in this specification and illustrated in the accompanying drawings which form a part hereof and wherein:

FIG. 3 is a fragmentary side elevational view of FIG. 1 showing the detail of the end construction of the conveyor slats; and, FIG. 4 is a cross-sectional view of FIG. 1 taken approximately on the line 4—4 thereof.

Figure 1:
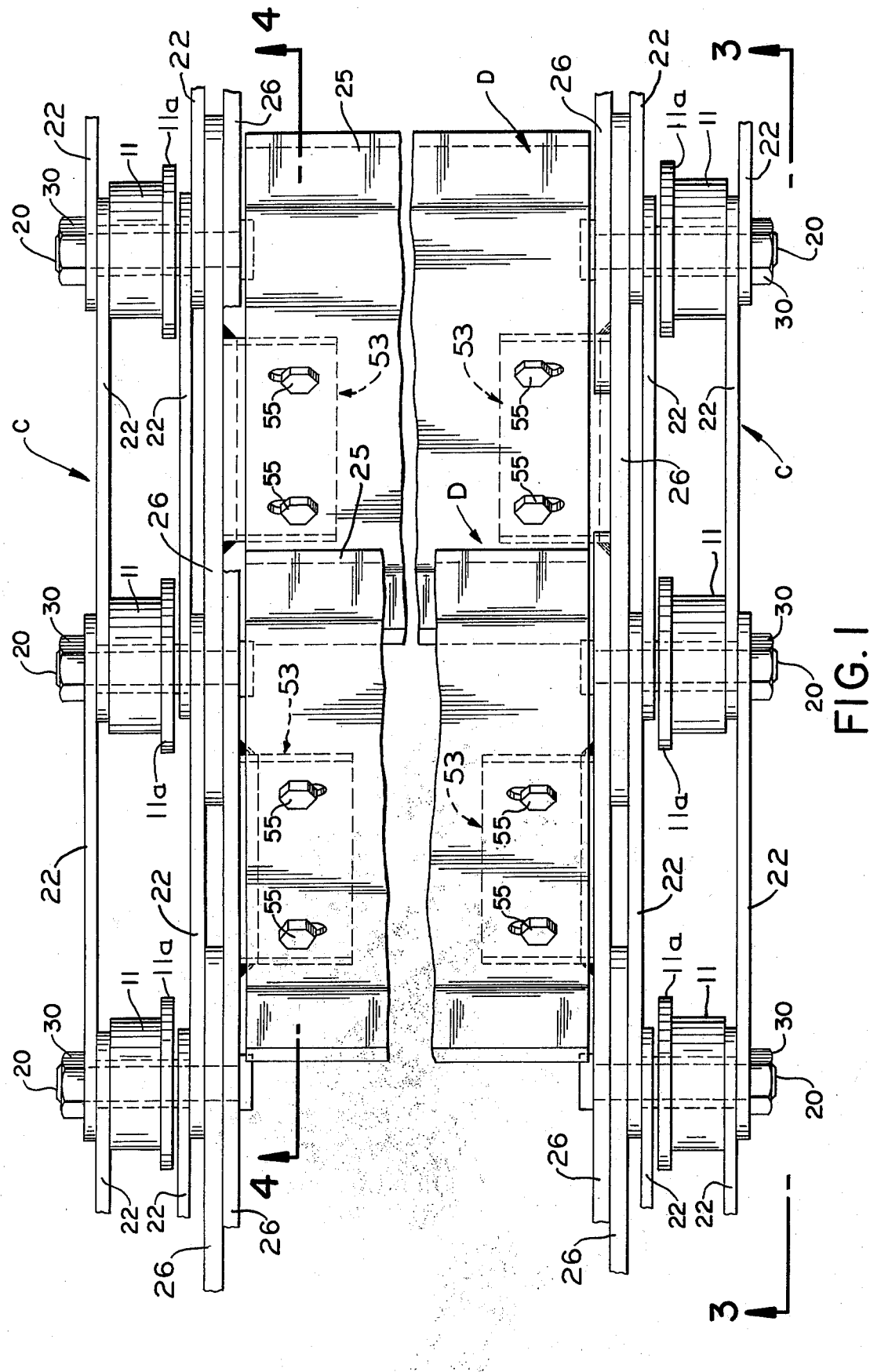
FIG. 1 is a top elevational view of a conveyor belt illustrating a preferred embodiment of the invention.
Figure 2:
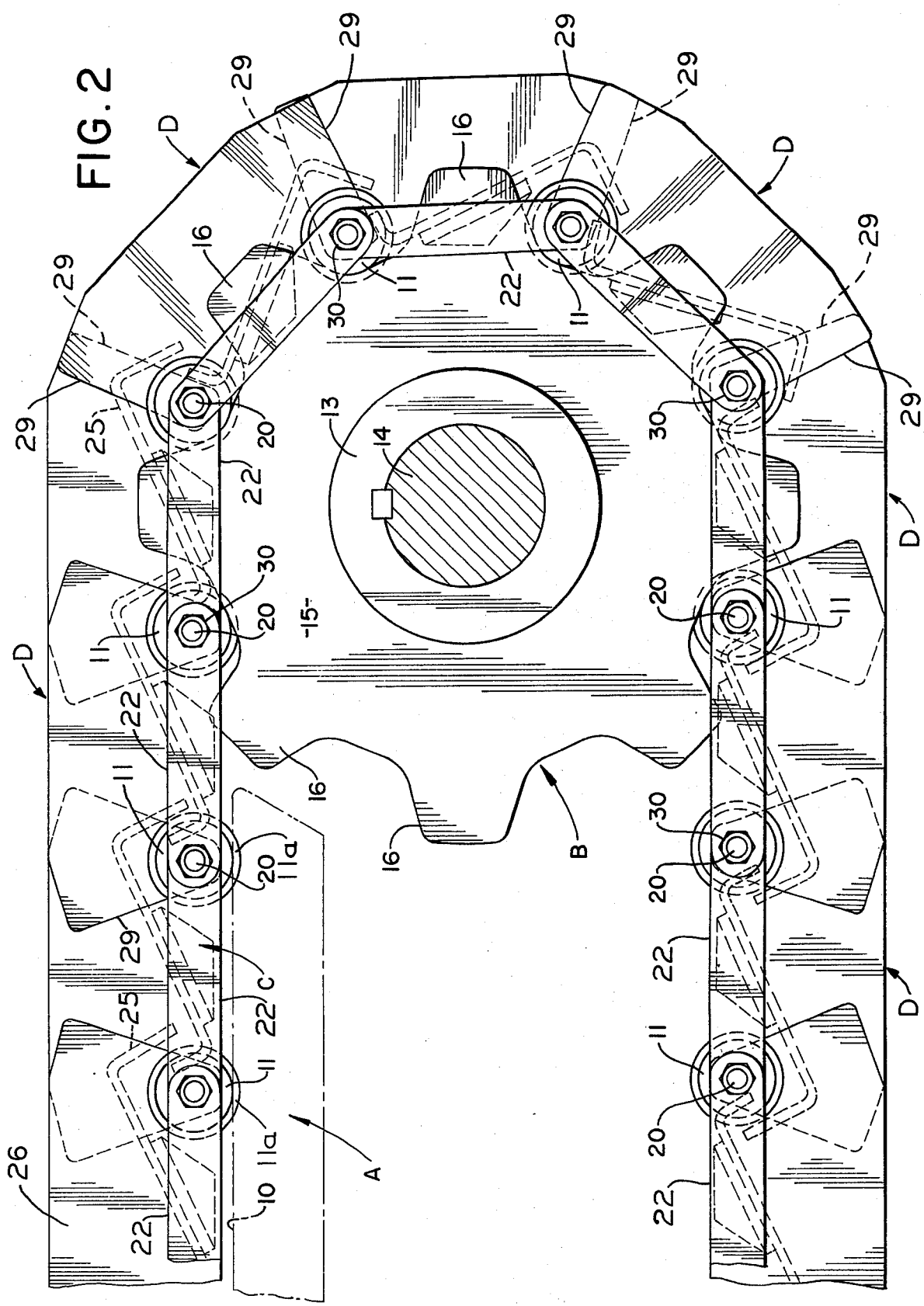
FIG. 2 is a side elevational view of FIG. 1 but showing the sprocket construction for reversing the direction of movement of the conveyor belt.

Referring now to the drawings wherein the showings are for the purposes of illustrating a preferred embodiment of the invention only and not for the purposes of limiting same, the Figures show somewhat schematically a conveyor belt arrangement comprised of a supporting frame A having roller sprockets B at the ends, a pair of roller chains C movable on the frame and around the sprockets and a plurality of conveyor slat assemblies D extending transversely between the roller chains and moved along the frame A by the roller chains C.

The frame A forms no part of the present invention and includes an elongated track 10 on which rollers 11 of the roller chains C move while the conveyor belt is in operation. The sprockets B are also conventional and include a hub 13 keyed to and supported by a shaft 14 and an outer flange 15 having a plurality of sprocket teeth 16 extending radially outwardly therefrom. The pitch of the teeth 16 is conventional and corresponds to the spacing between the rollers 11 of the roller chain C to be described. The spacing of the teeth 16 can equal the spacing between two or even three of the rollers 11. Obviously there are sprockets at both ends of the tracks and either one or both may be power driven.

The roller chain C except for the lengths of the roller shafts is also relatively conventional and comprises a plurality of spaced rollers 11 having shafts 20 extending therethrough. The rollers 11 are held in spaced relation by rows of chain links 22, one row on each side of the rollers and with the ends of the chain links overlapping and pivotally supported relative to each other on the shafts 20. In the embodiment shown, the rollers have a cylindrical surface which rolls on the upper surface of the track 10 and a flange 11a which engages the inside of the track 10 and prevents lateral movement of the conveyor belt relative to the tracks. Obviously other configurations of rollers could be employed. These rollers as is conventional may be supported for rotation on shafts 20 by ball or sleeve bearings as desired.

As indicated, there are two roller chains in transversely spaced relation, each supported for longitudinal movement on correspondingly spaced tracks 10.

The conveyor slat assembly D is comprised of a plurality of slats 25 positioned between the two rows of roller chains and supported relative to the frame A and for movement longitudinally thereon by means of the roller chains. Heretofore, it has been conventional to affix the conveyor slats directly to the inner side links of the two roller chains such that the longitudinal forces on the conveyor slats are transmitted longitudinally along the chain links themselves. Such construction was heretofore satisfactory on smaller belts; however, where the loading on the conveyor slats was very heavy or the belt was subjected to severe shocks such as caused by dropping large objects thereon, the belt chain links had to be made unduly large and a different size chain link was required for each type of loading to be expected on the conveyor belt.

Thus, in accordance with the invention, the conveyor slats 25 are not fixed directly to the chain links but are each fixed to a separate slat link 26 of a length generally corresponding to the length of the chain links and each having openings through which the roller shafts 20 extend so that the ends of the slat side links overlap as do the chain links and are pivotally supported relative to each other by the roller shafts 20. In the embodiment of the invention shown the slat side links 26 have a lower edge 32a which is generally flush with the lower surfaces of the chain links 22 although this particular dimensioning is unimportant. Further in the embodiment shown, the slat links 26 have a width substantially greater than the chain side links 22 so that the upper surfaces 32 of the slat side links 26 are a substantial distance above the upper surface 33 of the chain side links so that the slat links 26 form a continuous wall to prevent material being carried by the conveyor belt from spilling laterally onto the roller chains C. The exact height of these slat side links 26 may be as desired, depending on the type of material to be handled by the conveyor belt. The ends 29 of these slat links 26 diverge upwardly so that when the belt goes around a sprocket, the ends will continue to overlap.

The chain side links 22 and the slat side links 26 are all held in assembled relationship by nuts 30 threaded on the end of each shaft 20.

It is to be noted that the slat side links 26 are of a thickness somewhat greater than the thickness of the chain side links 22 so as to have a greater longitudinal load carrying capacity than that of the chain side links 22.

In this manner, all of the longitudinal forces or substantially all of the longitudinal forces imposed on the conveyor slats 25 will be transmitted longitudinally of the belt to the sprocket B, not by the roller chain side links 22, but by the slat links 26 coacting with the roller shafts 20.

As is shown in FIG. 4, the conveyor belt moves from left to right. In the preferred embodiment of the invention, the slats have a generally Z shaped cross-sectional configuration comprised of a generally flat base 50, an upwardly extending right angled flange 51 at the lower or trailing end, and a generally downwardly extending right angled flange 52 at the leading edge.

The conveyor slats may be fastened to the slat side links 26 in any desired manner but in the preferred embodiment, an L shaped mounting member 53 is provided having one leg 53a fastened as by welding 56 to the inner surface of link 26 bolts 55 extend through transversely elongated openings in the other leg 54 and an aligned opening in the flat base 50 of the slat 25 to rigidly fasten each slat 25 to its mounting member and thus rigidly fasten it to its side plate 26, as shown.

The surface of leg 50 generally extends upwardly at an angle relative to the direction of movement of 25° although this angle may be more or less as desired. One half of the end 57 of each leg 53a is at an angle of 25° to the surface of leg 54 so that during assembly and welding, the angled end 57 may be placed parallel to the lower edge 32a of the side plate and effecting this angle of the surface 54 is facilitated.

Flange 51 is located on the leading side of its adjacent trailing shaft 20 generally as is shown in FIG. 4, while the flange 52 extends downwardly on the leading side of its adjacent leading shaft 20. This flange 52 also overlaps and leads the upwardly extending flange 51 of the adjacent conveyor slat 25. Furthermore, the length of the flange 52 is greater than the length of the flange 51 and is such that its end is in close spaced relationship to the upper surface of the flat portion 50 of the adjacent conveyor slat 25.

It has been known heretofore to mount conveyor slats on side plates which are separate and distinct from the side links of the chain which moves the conveyor slats along its predetermined path but so far as it is known, no one heretofore has ever provided a continuous series of slat side plates each of which overlap the adjacent plates and which are pivoted relative to each other on the same axle as the rollers and each of which is of the same length as the chain links so that the longitudinal forces on the conveyor slats can be transmitted along the length of the chain by large side plates designed to carry the heavy load and so that the chain itself can be designed to have just sufficient strength to support the weight on the conveyor belt perpendicular to the track 10.

By the type of construction shown and with the rigid fastening of the edges of the conveyor slats to the conveyor slat side plates, the conveyor belt has a substantial lateral stability that it would not otherwise have.

The invention has been described with reference to a preferred embodiment. Obviously, modifications and alterations will occur to others upon a reading and understanding of this specification and it is my intention to include all such modifications and alterations insofar as they come within the scope of the appended claims.

Having described my invention, I claim:

1. A continuous roller chain type conveyor belt of the type to be supported on a pair of parallel extending supporting tracks, sprocket members at each end of each track, said belt including a pair of laterally spaced roller chains each comprised of a plurality of rollers and a row of chain links one on each side of said rollers and overlapping at the ends, roller shafts extending through said rollers and the overlapping ends of said chain links, a plurality of individual conveyor slats extending transversely between said roller chains; the improvement which comprises: a plurality of substantially flat slat links one affixed to each end of said slats and in continuous overlapping relationship at the ends, the vertical height of said slat links being substantially greater than the vertical height of said chain links in order to laterally retain material on said conveyor, said roller shafts extending through the overlapping portions of said slat links and holding same in pivoted relationship, the length between the pivot points of said chain and slat links being substantially equal so that longitudinal forces on said slats are transmitted through said slat links and said roller shafts.

* * * * *